Sept. 25, 1928.
C. L. WAGGONER ET AL
1,685,654
PROCESS OF TREATING COKE AND PRODUCTS
Filed April 9, 1928
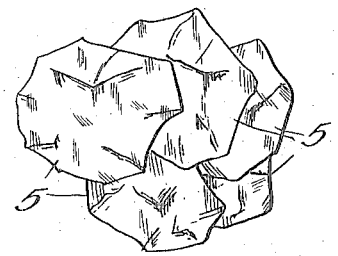
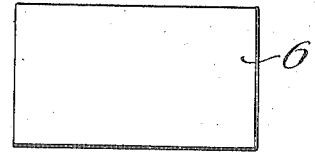
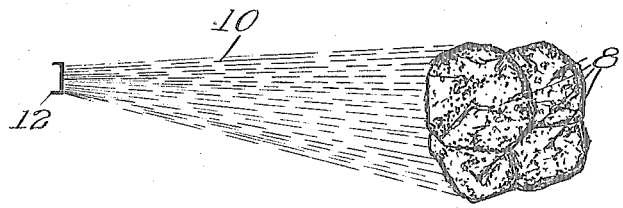
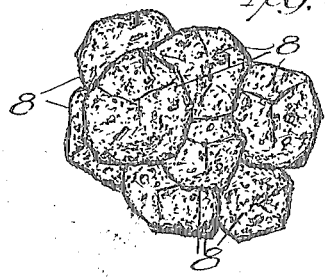
Witness:
Harry E. L. White
Inventors:
Charles L. Waggoner
Frank B. Thatcher Patented Sept. 25, 1928.

1,685,654

UNITED STATES PATENT OFFICE.

CHARLES L. WAGGONER AND FRANK B. THACHER, OF CHICAGO, ILLINOIS, ASSIGNORS TO BY-PRODUCTS COKE CORPORATION, OF CHICAGO, ILLINOIS, A CORPORATION OF ILLINOIS.

PROCESS OF TREATING COKE AND PRODUCTS.

Application filed April 9, 1928. Serial No. 268,630.

This invention relates to improvements in coke and particularly to a process for improving high temperature distillation cokes and to the resulting fuel product.

Coke, as well understood in the art, is the solid residue resulting from the destructive distillation or partial combustion of coal, the volatile matter being expelled by heat and leaving a residue, the character of which varies according to the temperature to which the coal has been subjected and according to the nature of the coal treated.

With high temperature distillation cokes we find that the slagging together and clinkering of the ash and the matter of reducing or retarding the rapidity of combustion have presented difficult practical problems. In high temperature distillation cokes the prevention or reduction of clinker formation has heretofore commonly demanded the use of particular coals, preferably with a high fusion ash. These coals are frequently more expensive than ordinary coals. The desirability of a high fusion ash is as well known; to keep the fusion temperature sufficiently above the temperature in the hearth of the furnace that the ash will not slag and run together or clinker. Even where the fusion point of the ash is for example, say 2400 degrees Fahrenheit, we find that a temperature in the hearth of the furnace of the order of 2000 degrees Fahrenheit will very often cause localized fusion.

According to the present invention we provide for reducing this fusion and the slagging or clinker formation, also for improving combustion and eliminating or reducing dust in high temperature distillation cokes. We accomplish this by treating the coke with a hygroscopic and deliquescent or moisture absorbing substance after or subsequent to the high temperature distillation process. In this manner we avoid removing the moisture absorbing means by the high temperature distillation process and by carrying out the distillation or coking step first we free the fuel of the oily or other substances tending to prevent or obstruct permeation or percolation of the water absorbing substance to all parts of the mass. Also by removing the volatile constituents first, the mass is brought to a more porous condition and its density is decreased, all of which results in more complete and in greater freedom of permeation or percolation of the moisture absorbing solution or substance through the entire mass and to all parts thereof. The treatment of the high temperature distillation coke after the high temperature distillation process assures the presence of the hygroscopic and deliquescent or moisture absorbing substance in the resulting high temperature distillation coke product and the presence of this hygroscopic and deliquescent or moisture aborbing substance may retard combustion and reduce and tend to maintain the temperature in the hearth of the furnace below the fusion point of the ash or at least sufficiently low that the ash will not clinker as objectionably as heretofore.

We have found that where the fuel is treated with a hygroscopic and deliquescent or water absorbing substance such as for example calcium chloride in an aqueous solution and thereafter subjected to high temperature distillation that the water or moisture absorbing substance is removed or liberated by the relatively high temperatures which accompany high temperature distillation and that the resulting product is freed of these substances and devoid of any of the desired improvements or advantages. While with low temperature distillation or semi-coking processes which may be carried out under relatively low temperatures, approximately 450 degrees centigrade the treatment may be done before the low temperature or partial distillation and the hygroscopic or moisture absorbing material may appear in the finished product without having been liberated or removed by the relatively low temperature, with high temperature distillation methods for more completely removing the volatile constituents as well understood in the art, the process of applying the hygroscopic or deliquescent substance in the retort or before introduction into the retort is wholly unsuitable.

The hygroscopic and deliquescent or moisture absorbing substance in addition to preventing or reducing slagging and clinker formation in the subsequent use of the resulting product and reducing or retarding the rapidity of combustion of the resulting fuel has the further advantage of allaying dust and providing a dustless high temperature distillation coke.

Calcium chloride because of its relatively low cost is preferably employed as the hygroscopic and deliquescent or moisture absorbing substance, but other analogous hygroscopic and deliquescent or moisture absorbing substances are contemplated and where in the appended claims we refer to hygroscopic and deliquescent or moisture absorbing substances of the barium group, we intend to include any other analogous substances. The barium group as intended herein includes calcium chloride, magnesium chloride and the like.

In order to fully acquaint those skilled in the art with the manner of practicing or carrying out the present invention, we shall now describe a particular embodiment of the invention in connection with the accompanying drawing forming a part of this specification, it being understood that this detailed description is illustrative and not limiting.

We do not intend to be limited to the particular ingredients or proportions hereinafter mentioned except as they are included in the appended claims and various changes and departures are contemplated within the scope of said claims.

In the drawing:

Fig. 1 is an illustrative showing of several lumps of bituminous or other suitable coking coal;

Fig. 2 illustrates diagrammatically the step of coking or high temperature distillation;

Fig. 3 is an illustrative showing of the step of treating the coke with the moisture absorbing substance; and Fig. 4 is an illustrative showing of the finished product.

In carrying out the invention, the bituminous or other suitable coking coal shown illustratively at 5 in Fig. 1 is first passed through the coking or distillation process as, for example, by placing it in any suitable or preferred coking oven or retort as illustrated at 6 in Fig. 2. The coking is preferably carried out by a high temperature distillation process which expels or removes the volatile constituents much more completely than with the semi-coking or low temperature processes. Those skilled in the art are familiar with the high temperature distillation and low temperature distillation methods of producing coke now in use, as well as with the differences in action and results produced and it is not believed necessary to go into the precise temperature ranges or other differences here.

Suffice it to say that with the present invention, the coking may be and is preferably done with a high temperature distillation process as now distinguished in the art from the processes of the low temperature distillation type. It is to be understood, of course, that the fuel may be washed and prepared or passed through any suitable or preferred treatments before subjecting it to the coking or distillation process.

The high temperature distillation process completely or substantially completely expels or removes the volatile constituents or at least obtains a much better or complete removal than obtained with semi-coking or low temperature distillation processes in which only a partial removal of the substances is obtained. This high temperature distillation before treating the coke with the moisture absorbing substance frees the fuel of the oily or other substances tending to prevent or obstruct permeation or percolation through the entire body and to all parts of the mass, at the same time reducing the density and bringing the mass to a porous condition as shown illustratively at 8 in Figs. 3 and 4.

After removing the oily substances and other volatile constituents and bringing the coke to the porous condition shown at 8 in Fig. 3, we treat the same with a moisture absorbing and preferably hygroscopic and deliquescent substance to render the coke moisture absorbing for the purpose of eliminating dust, preventing and reducing clinker formations and improving combustion.

The moisture absorbing substance is preferably applied in a suitable liquid solution and percolates or permeates through the porous pieces of coke to all parts of the body of each piece. The coke may be subjected to the moisture absorbing solution in any suitable or preferred manner. In Figure 3, we have shown the substance or solution sprayed at 10 upon and over the coke from a suitable sprayer 12. This is merely illustrative of one manner of applying this substance or subjecting the coke thereto and it is to be understood that the coke may be immersed in the solution or any other suitable manner of applying the moisture absorbing substance or subjecting the coke thereto may be employed. We find that due to the porous condition and low density of the coke and also due to the substantially complete removal of the oily substances therefrom that the moisture absorbing solution percolates or permeates much more freely through and to all parts of the mass with highly improved and uniform results in the resulting product. The coke may be treated with the moisture absorbing substance as it is loaded for shipment or at any other desired time after the coking or distillation process.

As illustrative of a moisture absorbing substance for treating the coke, we have found that a solution of calcium chloride and water in substantially the proportions of 20% calcium chloride to 80% water is suitable. This solution may be varied in strength or concentration and other salts or substances may be added to meet different temperature conditions or to decrease the viscosity of the moisture absorbing substance. The calcium chloride need not be chemically pure but may be and preferably is commercial calcium chloride with the usual impurities. Commercial calcium chloride is relatively inexpensive and the present process may be carried out and the improved coke provided with relatively little added cost per ton.

We claim:—

1. The process of improving coke formed by high temperature distillation process and brought to a porous condition of relatively low density with the oily substances and volatile constituents substantially completely removed, which comprises treating the porous mass subsequent to the high temperature distillation process with a moisture-absorbing substance of the barium group.

2. The process of improving coke formed by high temperature distillation process and brought to a porous condition of relatively low density with the oily substances and volatile constituents substantially completely removed, which comprises treating the porous mass subsequent to the high temperature distillation process with a moisture absorbing substance of the barium group and in liquid solution.

3. The process of improving coke formed by high temperature distillation process and brought to a porous condition of relatively low density with the oily substances and volatile constituents substantially completely removed, which comprises treating the porous mass subsequent to the high temperature distillation process with a hygroscopic and deliquescent substance of the barium group.

4. The process of improving coke formed by high temperature distillation process and brought to a porous condition of relatively low density with the oily substances and volatile constituents substantially completely removed, which comprises treating the porous mass subsequent to the high temperature distillation process with a hygroscopic and deliquescent substance of the barium group in liquid solution.

5. The process of improving coke formed by high temperature distillation process and brought to a porous condition of relatively low density with the oily substances and volatile constituents substantially completely removed, which comprises treating the porous mass subsequent to the high temperature distillation process with a solution of calcium chloride.

6. The process of treating coke to reduce fusion, slagging and clinker formation, which comprises treating the coke subsequent to the coking process with a moisture absorbing substance of the barium group.

7. The process of improving coke formed by high temperature distillation process and brought to a porous condition of relatively low density with the oily substances and volatile constituents substantially completely removed, which comprises treating the porous mass subsequent to the high temperature distillation process with a solution of calcium chloride and water in substantially the proportion of 20% calcium chloride to 80% water.

8. As a new composition of matter a high temperature distillation coke, treated with a moisture absorbing substance of the barium group.

9. As a new composition of matter a high temperature distillation coke, treated with a hygroscopic and deliquescent substance of the barium group.

10. As a new composition of matter a high temperature distillation coke, treated with and containing calcium chloride.

In witness whereof, we hereunto subscribe our names this 2nd day of April, 1928.

CHARLES L. WAGGONER.
FRANK B. THACHER.